Figure 1:
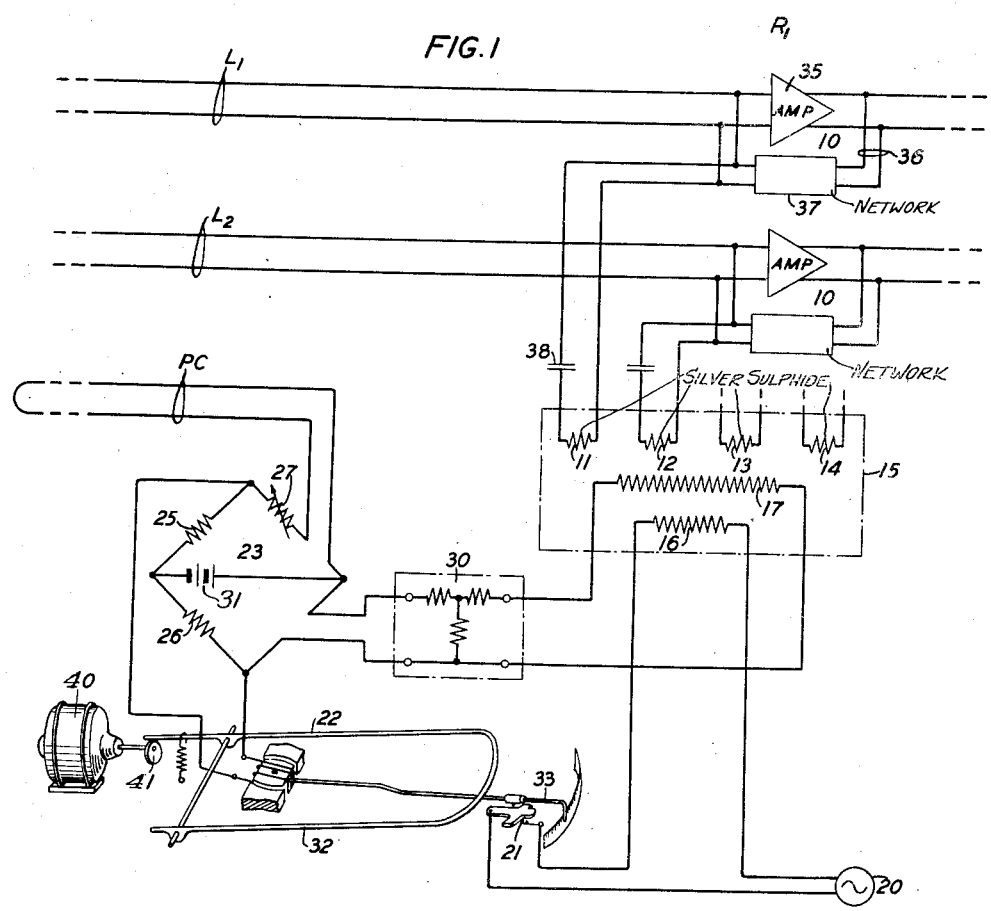

May 10, 1938.    J. R. FISHER ET AL    2,116,600
ELECTRICAL TRANSMISSION CONTROL
Filed April 25, 1935

INVENTORS: J.R. FISHER
C.O. MALLINCKRODT
BY  H.A. Burgers
ATTORNEY

Patented May 10, 1938

2,116,600

UNITED STATES PATENT OFFICE 2,116,600

ELECTRICAL TRANSMISSION CONTROL

Joseph R. Fisher, Brooklyn, and Charles O. Mallinckrodt, Forest Hills, N. Y., assignors to Bell Telephone Laboratories, Incorporated, New York, N. Y., a corporation of New York Application April 25, 1935, Serial No. 18,218

19 Claims. (Cl. 178—44)

The present invention relates to the transmission and control of electrical currents or waves for signaling or other purposes, and especially to the use of silver sulphide in electrical circuits.

Silver sulphide has been known for its high temperature coefficient of resistance for a century. Faraday's Published Researches, Series IV, April 1833, paragraphs 432 to 439, deal particularly with this material. It has been the subject, since that time, of considerable study by physicists in an endeavor to account for its behavior especially at and near the transition point, which occurs abruptly at a temperature of 179° C.

Silver sulphide, as appreciated by Faraday, is a mixed conductor at ordinary temperatures and as such is subject to electrolytic decomposition by direct current. It has been suggested that its direct current polarization might be inhibited by employing silver iodide between the silver sulphide and a silver electrode but this would not be effective beyond the rather restricted temperature range of 145° to 179° C. Attempts to use silver sulphide in direct current circuits at ordinary temperatures have been unsatisfactory because of the polarization effects of direct current on this substance.

Recent investigators, for example Tubandt and Reinhardt, (Zeitschrift für anorganische und allgemeine Chemie 160, 222 to 235, 1927, and Zeitschrift für physikalische Chemie 24, 22, 1934), have conducted some of their studies on the material by using alternating current, which, it is found, does not disturb the constitution of the material.

While, as stated, silver sulphide has been of some academic interest for a long time, it has apparently remained for applicants to discover the adaptability of this material to useful applications, such as actual transmission lines for commercial use.

One typical application of silver sulphide, to be illustrated and described herein, is in connection with the variable control of a system to compensate for changes in transmission characteristic. It has been proposed heretofore to use as the variable element in such a system a resistance-material subjected to variable heating in a heat chamber, e. g. U. S. patent to E. I. Green 1,918,390, July 18, 1933. The effectiveness of such a scheme of control considered in competition with other possible types of control, depends, among other things, upon the transmission properties of the heat-controlled material that is effectively inserted into the line, upon its law of change of resistance with temperature, upon its availability in economical form, its size and normal or mean value of resistance, upon its temperature coefficient, upon the range of temperatures within which it is effective, and upon the power required to be expended to carry the material through its temperature cycle. In transmission properties, are included such highly important features as its stability with time, its capacity, its tendency to produce modulation, and the degree of constancy with frequency over a wide range if the material is to be used in broad band carrier or radio transmission. As a phase of stability, and also of law of change of resistance with temperature, there is the question of reproducibility for both ascending and descending temperatures and uniformity of variation with repeated temperature cycles.

Applicants investigated a large number of materials among which may be mentioned, tellurium and certain of its alloys, selenium in various forms, tungsten, and zinc oxide, all of which, while operative, were unsatisfactory for applicants' purposes in one or more of the various properties or features mentioned above. It was found, however, after considerable experimentation, that silver sulphide can be prepared and used in a way to measure up to every requirement imposed upon it, including all of those above enumerated, for high grade, reliable and accurate transmission control. In fact, of the many materials investigated, silver sulphide appears to have properties which render it uniquely suitable as a transmission control element.

The resistance-temperature relation of silver sulphide is given approximately by $$R = R_0 e^{-.05t}$$

where $R_0$ is the resistance before the assumed temperature change of $t$ degrees centigrade occurs and R is the resistance after this change of temperature has occurred. This relation holds for all temperatures between about 0° C. and 179° C. at which latter temperature the resistance abruptly falls to about one-fortieth of its former value for increase of less than 1° C. Above this transition temperature, the material apparently behaves similarly to a metal with a uniform small positive temperature coefficient. The coefficient as given by the above formula is such that the resistance of a given sample falls to half its previous value by a temperature rise of about 14° C. A sample of the material of the order of half an inch long has a resistance at room temperature of a few hundred or a few thousand ohms for practical diameters of fractions of an inch.

Careful measurements show its resistance to be unvarying with frequency from at least the audible range up to at least 2000 kilocycles, and no upper limit to this range of uniform resistance effects has been found or is known by the present applicants. It is found to possess neglibly small modulation and noise, to be stable and reproducible to a remarkable degree. Moreover, the small size and small thermal capacity of a sample of practical resistance value for transmission control purposes makes it exceedingly economical of heating current for control purposes, and a large ratio (e. g. 10 to 1) of resistance variation requires a temperature range that is readily obtainable in practice. Its large coefficient enables quick and extremely accurate control to be realized.

While several methods of preparation are possible, it will be assumed for purposes of the present disclosure that the resistance element is formed by pressing C. P. silver sulphide powder in a die at a pressure of about 16,000 pounds per square inch. The bars so formed are then protected by suitably covering their central portions while the end portions are sand-blasted and then covered with tin by the Schoop process, to form terminals. In one case, bars 1.3 centimeters long, 0.95 centimeter wide, and about 0.13 centimeter thick were sand-blasted and "Schooped" with tin from their ends back toward their centers, leaving a central region 13 millimeters long not so treated. These bars each had a resistance of between 1500 and 2000 ohms at room temperature. Similar bars except that their thickness was about 0.07 centimeter had a resistance in the neighborhood of 3000 ohms at room temperature. This method of preparation forms no part of the present invention but is the invention of J. R. Fisher and is claimed by him in a separate application, Serial No. 18,217 filed of even date herewith.

Figure 2:
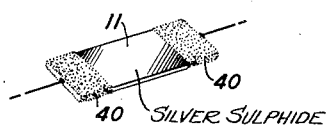

The present invention, its objects and features, and the preferred manner of practising it will be more fully understood from the detailed description to follow, together with the attached drawing in which Fig. 1 is a schematic diagram of a circuit embodying the transmission regulating method and system of the invention, and Fig. 2 is a detail drawing of a silver sulphide resistance element suitable for use in the system of Fig. 1.

Referring to Fig. 1, a number of lines, of which two are shown at $L_1$ and $L_2$, are included in a lead sheath (not shown) forming a telephone cable of standard construction, except that the lines in the present instance are preferably non-loaded, since it will be assumed that they carry currents of high frequencies for multiple telephony, for example frequencies extending up to the order of 100 kilocycles.

Repeater stations, of which one is shown at $R_1$, are located at intervals along the cable, of say ten to twenty-five miles, each comprising an amplifying repeater 10 for each line. Included within the cable sheath with the line pairs is one special pair PC used as a pilot conductor. This extends preferably throughout a repeater section and is closed, as shown, at the end remote from the regulator apparatus with which it cooperates.

The principal cause of variation in transmission equivalent of such a cable is change of temperature, which has the effect of changing the resistance of the lines due to the temperature coefficient of resistance of the copper of which the line wires are composed. Not only is the total change of resistance corresponding to extreme temperature differences between seasons of the year very considerable, but, especially in the case of aerial cables exposed to the sun's heat, the variations in one day may be of very great effect and these variations may occur very rapidly. Adequate compensation for these changes of resistance requires apparatus with sufficient range of adjustment and capable of effecting the necessary adjustments quickly and accurately.

In accordance with the present disclosure, the compensation is accomplished by controlling the gain of each repeater 10 at a repeater station by changing the temperature of a silver sulphide element associated with each repeater, such control being exercised in accordance with change of resistance of the pilot conductor and therefore indirectly in accordance with change of resistance of each of the line pairs, these changes occurring concurrently by virtue of the close association of the wires in the same cable sheath. The silver sulphide resistances are shown at 11, 12, 13, and 14 mounted inside a suitable heat chamber or oven 15 together with a heater resistance 16 and a temperature-sensitive control member 17. Elements 13 and 14 are assumed to be associated with other repeaters, not shown.

Heat energy is supplied to the heater coil 16 from some suitable source of power 20 under control of contact 21 of automatic galvanometer 22. Galvanometer 22 is in turn controlled from bridge 23 consisting of ratio arms 25 and 26, a third arm including the pilot wire PC together with an adjustable resistance 27 and a fourth arm comprising the resistor 17 placed in the oven 15, and network 30 for a purpose to be described. Battery 31 furnishes current for the bridge 23.

The operation of the regulator is as follows: It will be assumed that the cable temperature varies between the extremes of $-10°$ F. and $100°$ F., a total of $110°$ F. and that this range is to be compensated for by a ten-to-one change in the resistance of the silver sulphide elements 11, 12, etc., requiring a total temperature change of $40°$ or $50°$ C., at the most, for these elements. The mean temperature of the heat chamber can have any convenient value such as $150°$ F. ($65.55°$ C.). The resistance value of each element 11, 12, etc., may change from 6000 ohms at the lowest oven temperature to 600 ohms at the highest oven temperature used.

Let it be supposed that the cable is at its mean temperature and that the heat chamber is also at its mean temperature assumed to be $150°$ F. or much above room temperature. Galvanometer 22 is provided with any suitable timing mechanism, such as motor 40 and cam 41 for raising and lowering the bar 32 and depressing the galvanometer needle 33 every five seconds against the contact closer 21 when the needle registers with it. Contact 21 represents a slightly unbalanced condition of the bridge in a direction to call for more oven heat to restore balance. With conditions as assumed, the oven is cooling since the bridge is balanced. Resistance 17 (which may be, for example, platinum or copper covered with refractory substance) is so located that its resistance changes rapidly with small change of oven temperature, in this case, with slight cooling of the oven. The result is an unbalance of the bridge causing contact 21 to be periodically closed, under control of the five-second timer, and heat to be put into the oven from source 20 to heater 16. As the oven temperature again becomes normal contact 21 is no longer periodically closed and the oven begins to cool, starting a similar cycle of operations.

If the temperature of the cable falls from mean temperature, the relation might be such as to require the oven temperature to be either raised or lowered to compensate such change; but in accordance with the drawing it would be necessary for the oven temperature to fall also. This is accomplished by arranging that the resultant bridge unbalance swings the galvanometer needle towards the back in the drawing, preventing contact 21 from closing until the oven temperature has dropped sufficiently to restore the bridge to balance by decrease of resistance of element 17. Periodic supply of heat is then made as required to maintain the oven at the new temperature level, assuming the cable temperature remains for a time at its assumed lower temperature. Rise of temperature of the cable unbalances the bridge in a direction to hold the galvanometer needle over contact 21 continuously so that heat is supplied to the oven in sufficient quantity to reach a new condition of balance.

The type of repeater used at 10 may vary and also the manner of association of the silver sulphide 11, 12, etc., with the line or repeater may vary to suit conditions. In the form shown, repeater 10 is of the so-called stabilized feed-back type disclosed and claimed in United States application of H. S. Black, Serial No. 606,871, filed April 22, 1932. It is provided with an amplifying or forward portion 35 and a backwardly acting or feed-back portion 36 containing, in the form illustrated, an equalizer network 37 which may be used to compensate unequal line attenuation over the transmitted frequency range. The silver sulphide element, such as 11, is connected in shunt to the feed-back path through a stopping condenser 38, if necessary, to prevent direct current from reaching the silver sulphide element. As the resistance of element 11 decreases, for example, the fed-back waves are reduced by the shunting action of 11, and since the feed-back is such as to reduce the gain of the amplifier, the net result is an increase in gain of the repeater.

The appearance of element 11 or 12, etc., when made of compressed silver sulphide powder, as above described, may be as shown in Fig. 2 in which the central exposed portion 11 is silver sulphide and the end portions 40 represent the tin electrodes applied as above described. Lead wires are shown extending from terminals 40.

It will be observed that the total resistance change of pilot wire PC, elements 11, 12, 13 and 14 as well as that of element 17, and also the rate of change throughout the entire range, must be suitably coordinated if highly accurate compensation is to be attained. Network 30, illustrative of any type of corrective network, is inserted between the bridge arm opposite the pilot wire and the balancing resistor 17 so as to equalize any differences in extent or rate of change of the corrective effects and the changes calling for correction.

The rate of change of direct current resistance of the cable is substantially with temperature of the cable. If resistance 17 also has a linear rate, the oven temperature will vary substantially at a linear rate with respect to cable temperature. Since the silver sulphide elements 11, 12 etc. have an exponential rate of variation of resistance with temperature, they afford a convenient and direct means of introducing gain changes to compensate cable temperature effect since the rate of transmission loss variation of the cable with temperature is also exponential. In fact this rate is commonly expressed as a linear rate in terms of decibels.

One important advantage of the control system of the invention is that a large number of repeaters, such as all of those at the same repeater station, may be controlled by a common oven and bridge circuit. There is no conductive connection between the different silver sulphide elements and the capacity and inductive coupling between them may be reduced to harmless values by proper design. The use of a common oven and regulator for perhaps 100 or 200 repeaters makes for economy of apparatus.

The circuits and apparatus may be varied widely from the specific disclosure which is to be taken as illustrative rather than limiting. The scope of the invention is indicated in the claims.

What is claimed is:

1. In a transmission circuit for alternating currents, means comprising silver sulphide effectively coupled to introduce resistance into the circuit, and means for variably controlling the value of the resistance introduced into the circuit and for indefinitely repeating or reproducing any definite resistance value within a range of variation comprising means to vary in corresponding manner the temperature of said silver sulphide.

2. In a signaling system, a circuit carrying signaling current comprised of a wide band of frequencies and means comprising silver sulphide for controlling said signaling currents in accordance with changes in its temperature while introducing substantially no intermodulation between the different frequency components of said band.

3. In a transmission system, a circuit transmitting alternating currents, silver sulphide connected to introduce effective resistance into said circuit and means to vary the temperature of said silver sulphide to control the resistance of said circuit to any desired value within a range, the ratio of the extremes of which is in excess of 10.

4. In a transmission line system, a current controlling element comprising silver sulphide at a point in the line, and means controlled by the strength of currents traversing the system to control the temperature of said element, said element variably controlling current transmitted over the line in accordance with the temperature of the element.

5. An amplifier including in its circuit an element the resistance of which determines the amplifier gain, said amplifier transmitting currents of low amplitude with high fidelity and low noise and extending throughout a broad frequency band, said element comprising silver sulphide, and means to vary the temperature of the silver sulphide.

6. In a transmission system, a line including a repeater at a point on the line, a silver sulphide element variably controlling the gain of said repeater, and means controlled by variations in transmission characteristic of the line for controlling the temperature and, therefore, the resistance of said element.

7. In a transmission system for the transmission of waves of frequencies comprised in a band several times ten kilocycles wide, an element comprising silver sulphide traversed by said waves for controlling transmission over said line, and means to control the temperature of said element.

8. In a transmission system for the transmission of waves of frequencies comprised in a band several times ten kilocycles wide, a repeater for all of said waves, means to control the gain of said repeater comprising a silver sulphide resistor, and means to control the temperature of said resistor.

9. In a transmission system, a line whose transmission characteristic is subject to change with change of external conditions, means to transmit waves comprised in a broad band of frequencies over said line, a silver sulphide element effectively coupled to said line to introduce loss in said line, and means causing the temperature of said element to vary in correspondence with changes in said line characteristic in direction and amount to compensate in said line said changes in transmission characteristic with substantially zero intermodulation between the different frequency components of the transmitted waves.

10. A repeater comprising an amplifier having a gain-stabilizing feed-back circuit including silver sulphide, said silver sulphide resistor acting to vary the gain in accordance with changes in its temperature.

11. An amplifying repeater including as a circuit element a resistor comprising silver sulphide for controlling the gain thereof.

12. In a transmission line system whose characteristic is subject to change, a compensator comprising an elongated piece of silver sulphide a fraction of an inch in length enclosed in a heat chamber and related to the line to introduce varying loss into the line as its temperature is changed and means to vary the heating of said chamber to control the temperature of said silver sulphide in accordance with changes in said characteristic.

13. In combination with a cable comprising a plurality of line circuits, a repeater associated with each line circuit, a temperature-controlled element for varying the gain of each repeater, a common heat chamber inclosing all of said elements, and means to control the temperature of said chamber in accordance with temperature changes of said cable.

14. The combination with a broad frequency band signal transmission system, of a regulating circuit for controlling transmission over said system comprising a resistance unit and means to control its temperature to vary its resistance, said unit having a temperature coefficient of resistance comparable in magnitude with that of silver sulphide, a specific resistance such as to provide a resistance of the order of at least several hundred ohms at room temperature in a sample half an inch long and a small fraction of an inch in diameter, and having a value of resistance substantially constant at all frequencies within said broad band.

15. The combination with a transmission system for waves occupying a frequency band several kilocycles wide of a circuit for controlling transmission over said system comprising a solid substance variable resistor as a control element and means to vary its resistance by varying its temperature, said substance having a temperature coefficient of resistance large enough to enable a ten-to-one range of resistance variation within a temperature range of two hundred degrees centigrade or less, a specific resistance such as to provide a resistance of at least several hundred ohms at atmospheric temperature in a sample of the order of half an inch long, and a resistance substantially constant at all frequencies within said range.

16. The combination with a high frequency transmission system of a circuit for regulating transmission in said system comprising a resistance unit of solid substance having a temperature coefficient of resistance high compared to that of pure metals, and a resistance substantially constant with frequency throughout a range of the order of a megacycle in width, and means to vary the temperature of said unit to control its resistance.

17. In a system of transmission regulation, a resistance element coupled to the system so that its resistance is effectively in the system and controls transmission through the system, said element possessing a sufficiently high temperature coefficient of resistance to give the order of a 10-to-1 ratio of resistance variation for a temperature range including room temperature, said element having dimensions of the order of fractions of an inch.

18. A transmission system according to claim 17 with means for transmitting over the system currents comprised in a broad band of frequencies, said resistance element possessing negligibly small modulation and a high degree of constancy of resistance throughout said broad frequency band for any temperature within the aforementioned temperature range.

19. In an alternating current transmission system, a resistance element included in said system and connected to be traversed by the alternating currents transmitted by said system, said element variably controlling the currents in the system in accordance with the temperature changes of the element and capable of indefinitely reproducing the same changes in resistance with the same changes in its temperature, said element comprising silver sulphide.

JOSEPH R. FISHER.
CHARLES O. MALLINCKRODT.